(12) United States Patent
Gregg et al.

(10) Patent No.: US 7,360,222 B2
(45) Date of Patent: Apr. 15, 2008

(54) EXTENSIONS TO COUPLING CHANNELS TO SUPPORT MULTIPLE COUPLING FACILITY SHARING, INTERRUPTS, AND MESSAGE PASSING

(75) Inventors: Thomas A. Gregg, Highland, NY (US); Kulwant M. Pandey, Lagrangeville, NY (US)

(73) Assignee: International Business Machines Corporation, Armonk, NY (US)

( * ) Notice: Subject to any disclaimer, the term of this patent is extended or adjusted under 35 U.S.C. 154(b) by 469 days.

(21) Appl. No.: 09/961,013

(22) Filed: Sep. 21, 2001

(65) Prior Publication Data

US 2003/0061475 A1 Mar. 27, 2003

(51) Int. Cl.
*G06F 3/00* (2006.01)
(52) U.S. Cl. .................. 719/319; 719/312; 719/313; 719/314
(58) Field of Classification Search ............ 710/1–74, 710/260–269; 711/147–153; 718/100–108, 718/1; 719/312–319; 709/213–216
See application file for complete search history.

(56) References Cited

U.S. PATENT DOCUMENTS

| | | | | |
|---|---|---|---|---|
| 5,613,068 | A | * | 3/1997 | Gregg et al. ................. 709/216 |
| 5,659,786 | A | * | 8/1997 | George et al. ............... 713/100 |
| 5,878,205 | A | * | 3/1999 | Greenstein et al. ........... 714/11 |
| 5,923,890 | A | * | 7/1999 | Kubala et al. ................. 712/1 |
| 6,253,224 | B1 | * | 6/2001 | Brice et al. ..................... 718/1 |
| 6,647,508 | B2 | * | 11/2003 | Zalewski et al. .............. 714/3 |

OTHER PUBLICATIONS

IBM Technical Disclosure Bulletin "Highly Parallel Coupling Facility Emulator/Router with Shadowed Link Buffers" TDB-ACC-No. NN9612123, vol. 39 Dec. 1996.*

* cited by examiner

*Primary Examiner*—William Thomson
*Assistant Examiner*—Charles E Anya
(74) *Attorney, Agent, or Firm*—Lynn L. Augspurger

(57) ABSTRACT

A method for use in a computer system for extending coupling channels through the addition of specific hardware interrupts and controls to allow 1) sharing of receiver resources among multiple Coupling Facility (CF) logical partitions (LPARs), 2) direct CEC to CEC message passing, and 3) CF interrupts.

2 Claims, 9 Drawing Sheets

Figure 2
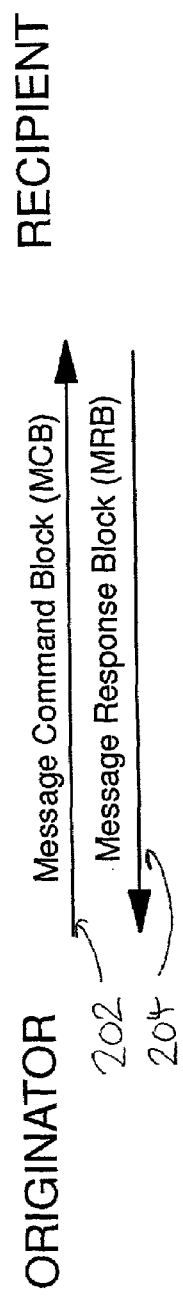
Figure 2a
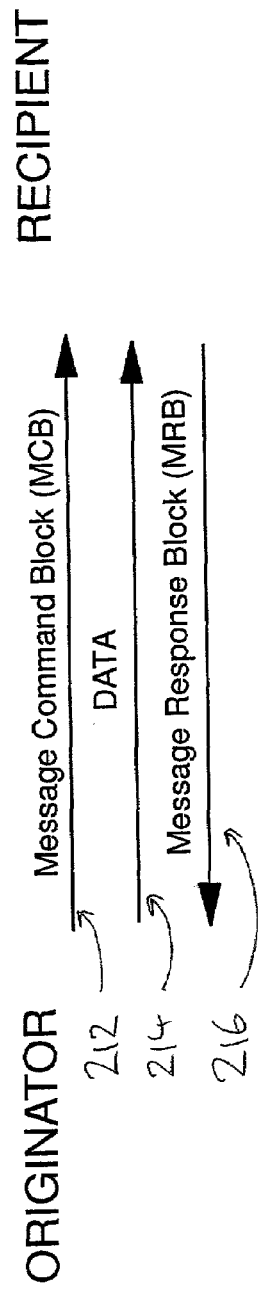
Figure 2b
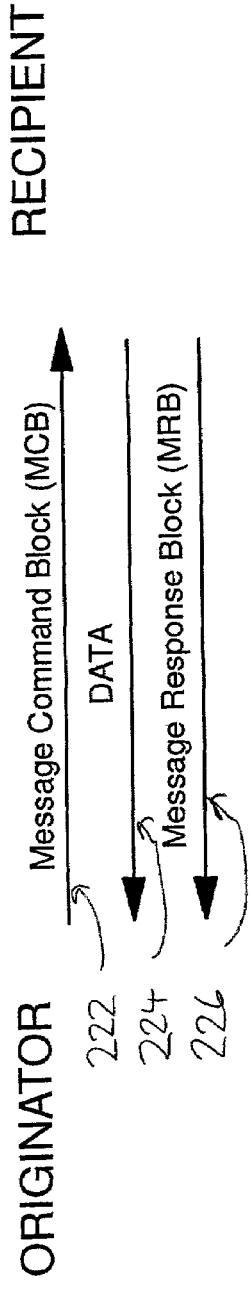
Figure 2c

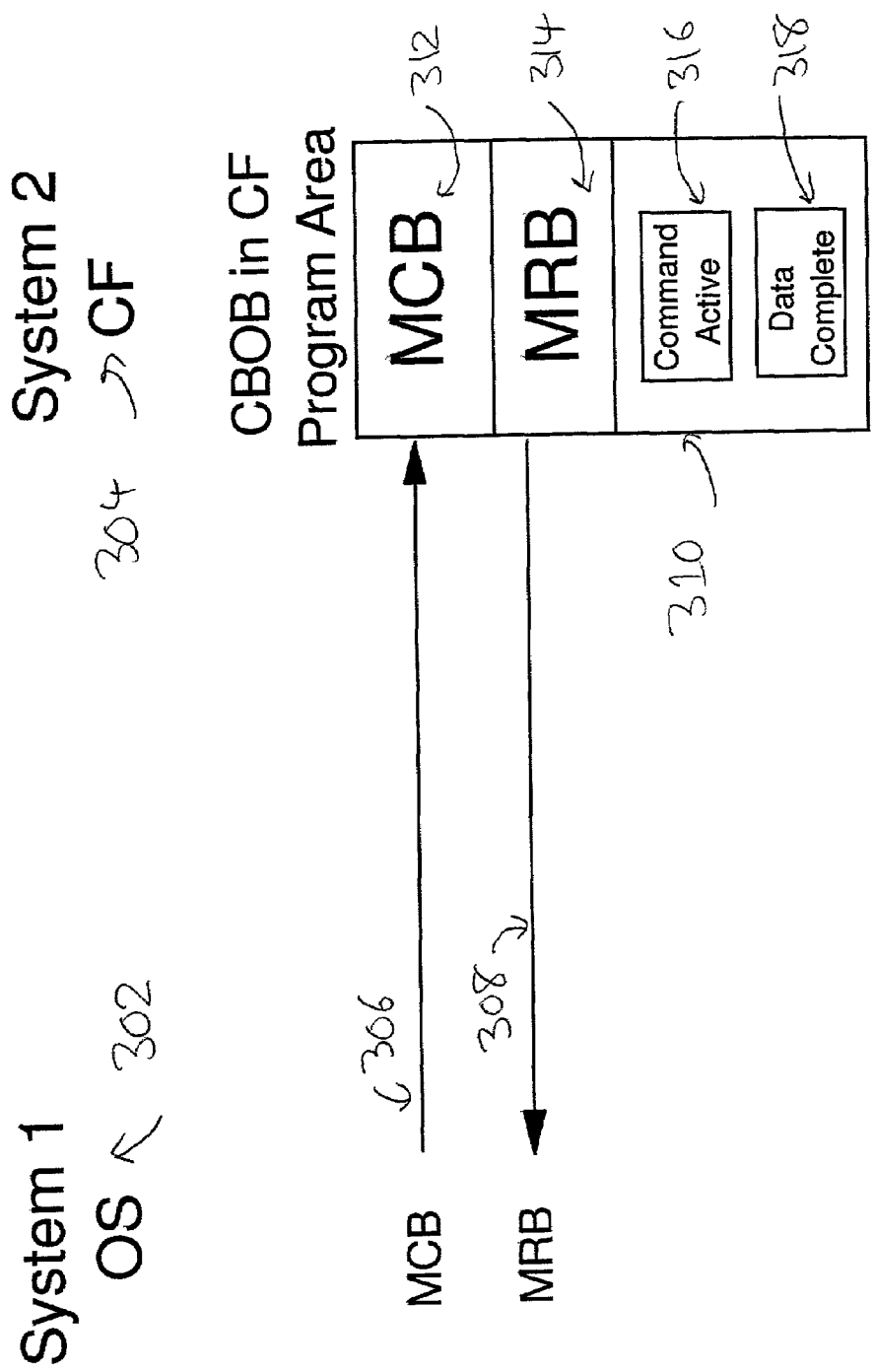

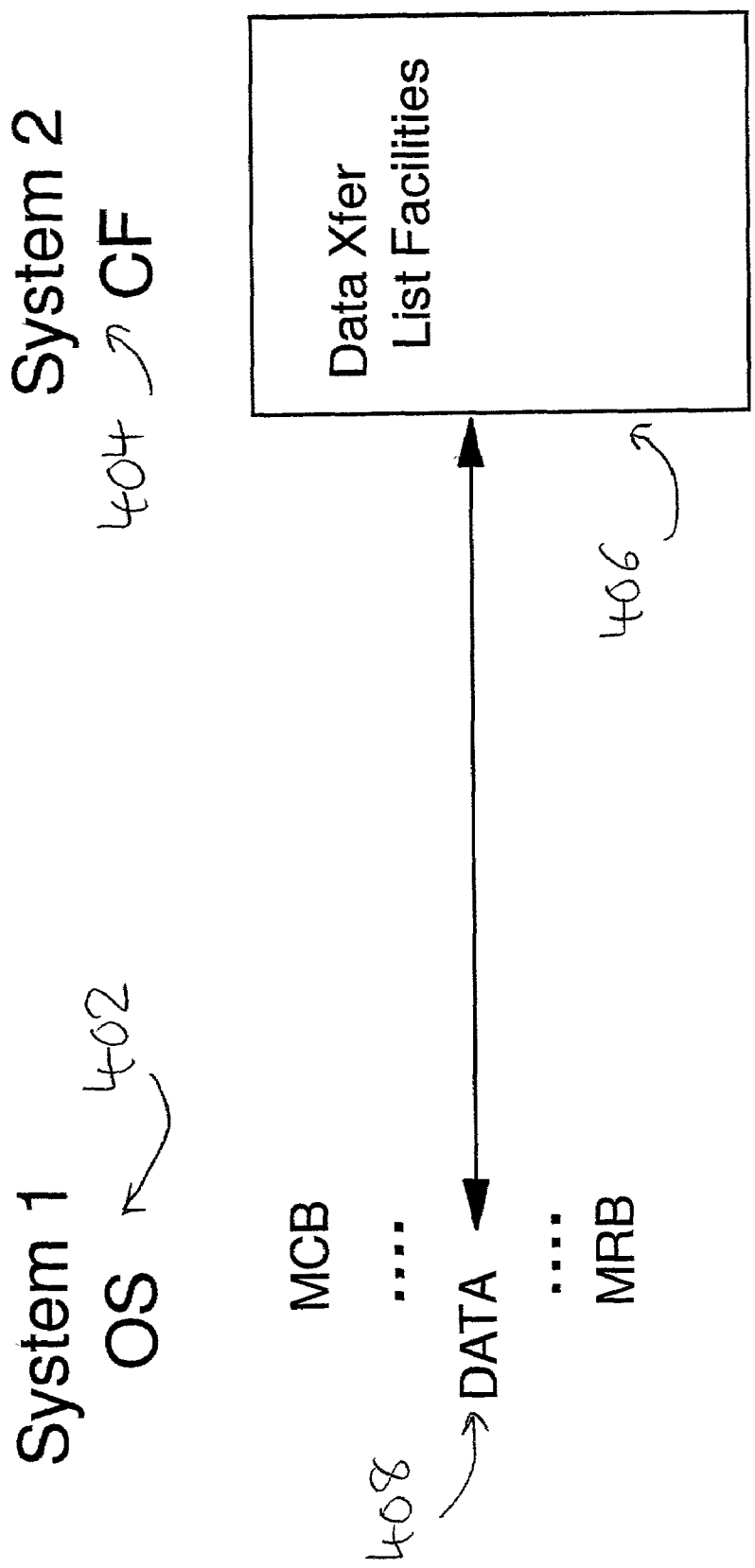

EXTENSIONS TO COUPLING CHANNELS TO SUPPORT MULTIPLE COUPLING FACILITY SHARING, INTERRUPTS, AND MESSAGE PASSING

TECHNICAL FIELD

The present invention relates generally to communications between computer systems and, more particularly, the present invention is directed to supporting a method and apparatus to send messages between multiple partitions within each computer system when a channel is shareable by plural operating systems in a computer electronic complex (CEC) supporting both shared and unshared I/O channels.

BACKGROUND

Presently, messages sent between a computer system and a coupling facility require Input/Output channels as generally described in U.S. Pat. No. 5,452,455: Asynchronous command support for shared channels for a computer complex having multiple operating systems, assigned to International Business Machines Corporation (IBM). Within prior IBM mainframes, as exemplified by the S/390 systems and recent z Series mainframes (s/390 and z Series are trademarks of IBM), while these channels can be shared by multiple operating system images within the computer system, the channel can only be allocated to a single coupling facility. These IBM mainframes are considered the closest prior art and described below in some drawings. This needed invention departs from the prior art practice and provides a mechanism needed to allow a single physical message I/O channel to be shared by multiple host images, both operating systems and coupling facilities, within a computer system having multiple CECs.

SUMMARY OF THE INVENTION

The present method supports sharing of coupling channels among multiple coupling facility images for primary messages sent from an operating system allowing the operating system to send messages between multiple partitions within each computer system when a channel is shareable by plural operating systems in one or more computer electronic complexes (CEC) having a hypervisor memory and supporting both shared and unshared I/O channels. The method uses the hypervisor's memory and provides for the computer electronic complex (CEC) with the computer system coupling Input/Output channels performing the steps of receiving a message request in the hypervisor's memory and interrupting said hypervisor; having the hypervisor examine fields within the message request to identify the target Coupling Facility; moving this message request to the targeted Coupling Facilities memory; and then setting an indicator in the targeted Coupling Facility to alert it to the arrival of the message request.

Using the method and hardware provided, now it will be possible to use said coupling Input/Output channels to pass messages directly between instances of the operating system without CF involvement.

These changes allow sharing of receiver resources among multiple Coupling Facility (CF) logical partitions (LPARs), and direct CEC to CEC message passing, as well as CF interrupts.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 2 depicts a diagram of the sequences of frames used in primary and secondary messages;

FIG. 3 depicts a diagram where the primary message MCBs and MRBs are sent directly to and from a single CF partition's memory;

FIG. 4 depicts a diagram where the data portion of the primary message is sent directly to and from a single CF partition's memory;

DETAILED DESCRIPTION OF THE PREFERRED EMBODIMENT

The IBM design of the coupling Input/Output channels, called InterSystem Channels (ISCs), used by the recently introduced successor to the IBM S/390 system call the IBM's zSeries mainframe computers allows ownership by only a single Coupling Facility (CF), and when multiple CFs are in a CEC, each needs its own ISCs. In addition, the only way that a CF detects that requests, data, and responses have been transferred is by polling. The Coupling Facility Control Code (CFCC) uses the Locate Channel Buffer (LCB) instruction to poll for the arrival of new messages and it spins on indicator bits in the Channel Buffer Operation Block (CBOB) to determine when data has been transferred and responses from secondary commands have been received.

Using the method and hardware provided, now it will be possible to use ISCs to pass messages directly between instances of the operating system without CF involvement. With the hardware in ISC the system can now generate hardware interrupts to the hypervisor as the message transfer progresses and extends the present transfer commands sent from the processors to the hardware and processor microcode to accept the interrupts and drive the new commands.

Figure 1:
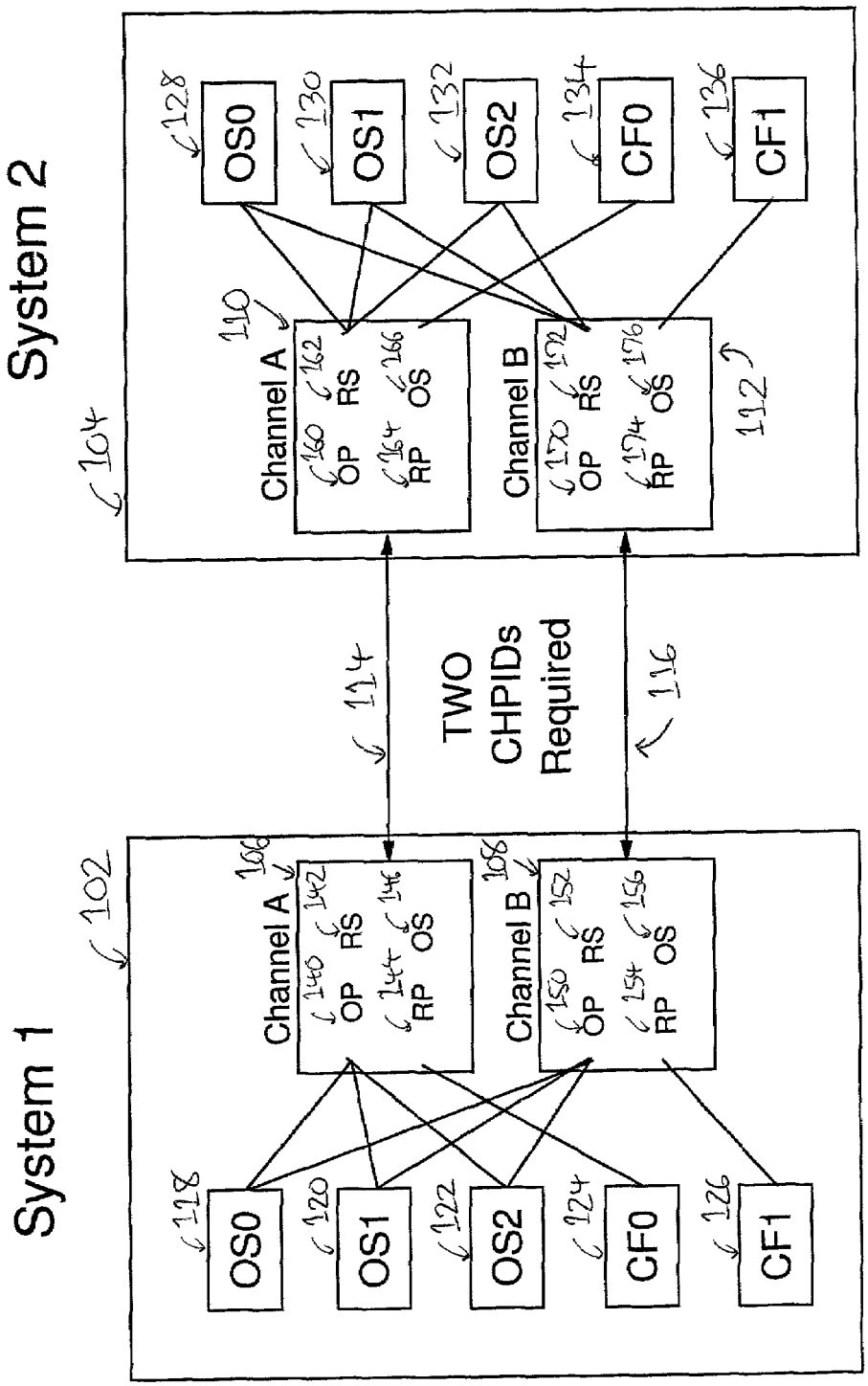
FIG. 1 depicts a diagram of two CECs, each containing three OS and two CF partitions where each CF partition requires its own I/O channel.

FIG. 1 shows the prior art where System 1 102 is connected to System 2 104 with two coupling channels, called InterSystem Channels, or ISCs. Channel A 106 in System 1 connects to Channel A 110 in System 2 104 over link 114. To support multiple Coupling Facilities (CFs), a second channel, Channel B 108 in System 1 102 is connected to Channel B 112 in System 2 104 over link 116. In System 1 102, Operating System 0 (OS0) 118, OS1 120, and OS2 122 can all share both Channel A 106 and Channel B 108, but Coupling Facility 0 (CF0) 124 and CF1 126 cannot share Channel A 106 or Channel B 108. Instead, a separate channel is dedicated to each CF. In this example, CF0 124 uses Channel A 106 and CF1 126 uses Channel B 108. A similar situation exists in System 2 104. In System 2 104, OS0 128, OS1 130, and OS2 132 can all share both Channel A 110 and Channel B 112; and CF0 134 uses Channel A 110 and CF1 136 uses Channel B 112.

Within each channel there are facilities used to send and receive coupling messages. Originator Primary (OP) facilities 140, 150, 160, 170 send primary messages from an OS to a CF; Recipient Primary (RP) facilities 144, 154, 164, 174 receive primary messages by a CF from an OS; Originator Secondary (OS) facilities 146, 156, 166, 176 send secondary messages for a CF to an OS; and Recipient Secondary (RS) facilities 142, 152, 162, 172 receive secondary messages from a CF to an OS. It should be understood that multiple OP, RP, OS, and RS facilities may be present in each channel to allow multiple simultaneous messages. In the present embodiment, seven facilities of each type are in each channel.

FIG. 2 shows the sequences of frames used in primary and secondary messages. FIG. 2a is the no data case where a Message Command Block (MCB) 202 is sent from the originator to the recipient; primary messages may have optional data and secondary messages never have data. The recipient responds by sending the Message Response Block (MRB) 204 back to the originator. FIG. 2b is the write case. The Message Command Block (MCB) 212 is sent from the originator to the recipient followed by Data 214. After the recipient receives the Data 214, it sends the Message Response Block (MRB) 216 back to the originator. FIG. 2c is the read case. The Message Command Block (MCB) 222 is sent from the originator to the recipient. When the recipient processes the MCB 222, it sends Data 224 back to the originator. The recipient then sends the Message Response Block (MRB) 226 back to the originator.

FIG. 3 shows how the prior art sends a primary message with no optional data from an OS in System 1 302 to a CF in System 2 304. Primary messages in the form of Message Command Blocks (MCBs) 306 are sent directly to an area of main memory owned by the CF called the Channel Buffer Operation Block (CBOB) 310. Within CBOB 310 the MCB is stored in the MCB area 312. Likewise, the Message Response Block (MRB) 308 is sent from an area 314 in the same CBOB 310. The sequence is as follows:

1) The MCB 306 is stored directly in the CF's memory in the CBOB 310.

2) The channel sets the Command Active indicator 316 in the CBOB to alert the CF.

3) The CF executes the Locate Channel Buffer (LCB) instruction that scans Command Active indicators in the CBOBs owned by the CF looking for work.

4) If a Command Active indicator is set, the CF examines the MCB 312 in CBOB 310 and executes the command.

5) The CF generates the response, the MRB, and places it into the CBOB 314.

6) The CF executes an instruction that causes the channel to transmit the MRB 308 back to the OS.

While this arrangement allows the MCB to be stored directly into the CF's memory, it does not allow multiple CFs to share a channel.

FIG. 4 shows how the prior art moves the optional data between an OS in System 1 402 to a CF in System 2 404. The data is sent directly to and from the CFs main memory and comprises the following steps:

1) The CF in System 2 404 decodes the MCB (as described in FIG. 3) and determines that there is data to be transferred.

2) The CF 404 builds an address list of the data to be moved and loads the Data Transfer List Facilities 406.

3) The CF 404 executes a special instruction to move the DATA 408.

4) The channel moves the DATA, and when the DATA 408 has been moved, the channel sets the Data Complete indicator 318 in the CBOB 310 (see FIG. 3).

5) When the CF 404 detects the indicator (by polling), it sends the MRB back to the OS as described in FIG. 3.

Figure 5:
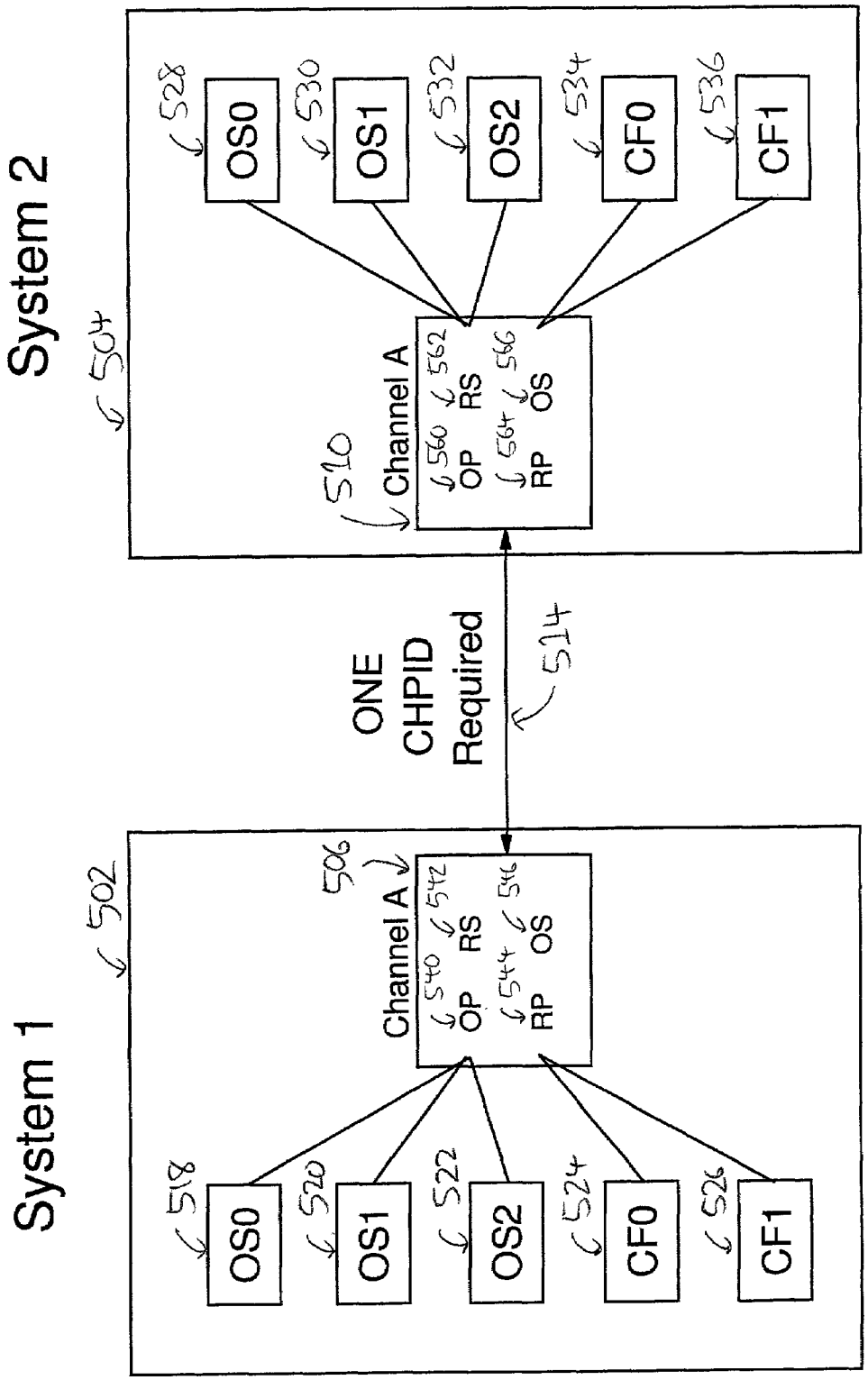
FIG. 5 depicts a diagram of two CECs, each containing three OS and two CF partitions where the two CF partitions share a single I/O channel in accordance with a preferred embodiment of the present invention.

FIG. 5 shows the present embodiment where multiple CFs share a channel resulting in saving the hardware associated with the additional channel (Channels B) shown in FIG. 1. The figure is very similar to FIG. 1, but System 1 502 has only Channel A 506, and System 2 504 has only Channel A 510. Also, CF0 524 and CF1 526 in System 1 502 both share Recipient Primary (RP) 544 and Originator Secondary (OS) 546 facilities, and CF0 534 and CF1 536 in System 2 504 both share Recipient Primary (RP) 564 and Originator Secondary (OS) 566 facilities. It should be understood that Channels A 506, 510 may be shared by more than just two Cfs.

Figure 6:
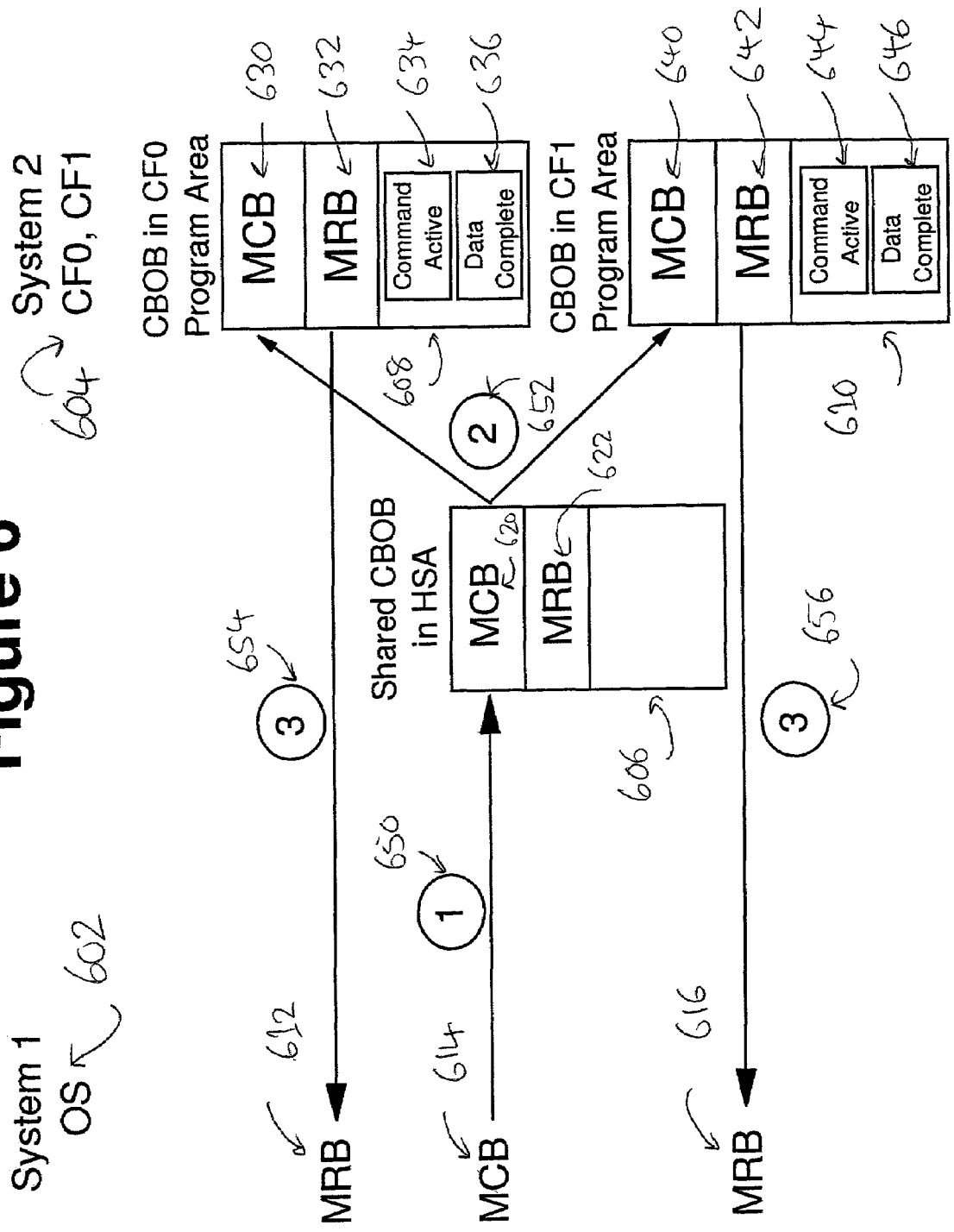
FIG. 6 depicts a diagram where the primary message MCBs of the present invention are sent to a common area before they are routed to one of the two CFs, and the primary message MRBs are sent directly from one of the two CFs' memories in accordance with a preferred embodiment of the present invention.

FIG. 6 shows the flow of message frames within System 2 604 where two CFs share a recipient primary facility. Instead of sending the MCB 614 from System 1 602 directly to the main memory of the CF in System 2 604, the MCB 614 is received by System 2 604 in a special shared CBOB 606 located in the System 2 hypervisor's memory, called Hardware System Area (HSA). This is shown as Step 1 650. After the MCB is stored in an area 620 of the CBOB 606, System 2's 604 channel generates a hardware interrupt to its hypervisor. The hypervisor then examines a new field in the MCB in CBOB area 620 to determine to which CF the MCB should be sent. In step 2 652, the MCB is sent to either the CBOB 608 in CF0's main memory or to the CBOB 610 in CF1's main memory. After the hypervisor moves the MCB to either area 630 or area 640, it sets the Command Active indictor 634, 644 in either CBOB 608, 610 to alert either CF0 or CF1, respectively. At this point, the CF0 and CF1 operate in the same manner as in FIG. 3. Namely, both CFs execute the Locate Channel Buffer (LCB) instruction that scans the CBOBs owned by the CF looking for work. In this case, only one of the CFs finds the Command Active indicator set, and that CF examines the MCB 630, 640 in CBOB 608, 610 and executes the command. The CF then generates the response, the MRB 632, 642, and places it into the CBOB 608, 610. The CF then executes an instruction telling the channel to transmit the MRB 612, 616 back to the OS as shown in steps 3 654, 656. The channel knows which MRB 632, 642 to transmit since it knows which CF is executing the instruction.

Figure 7:
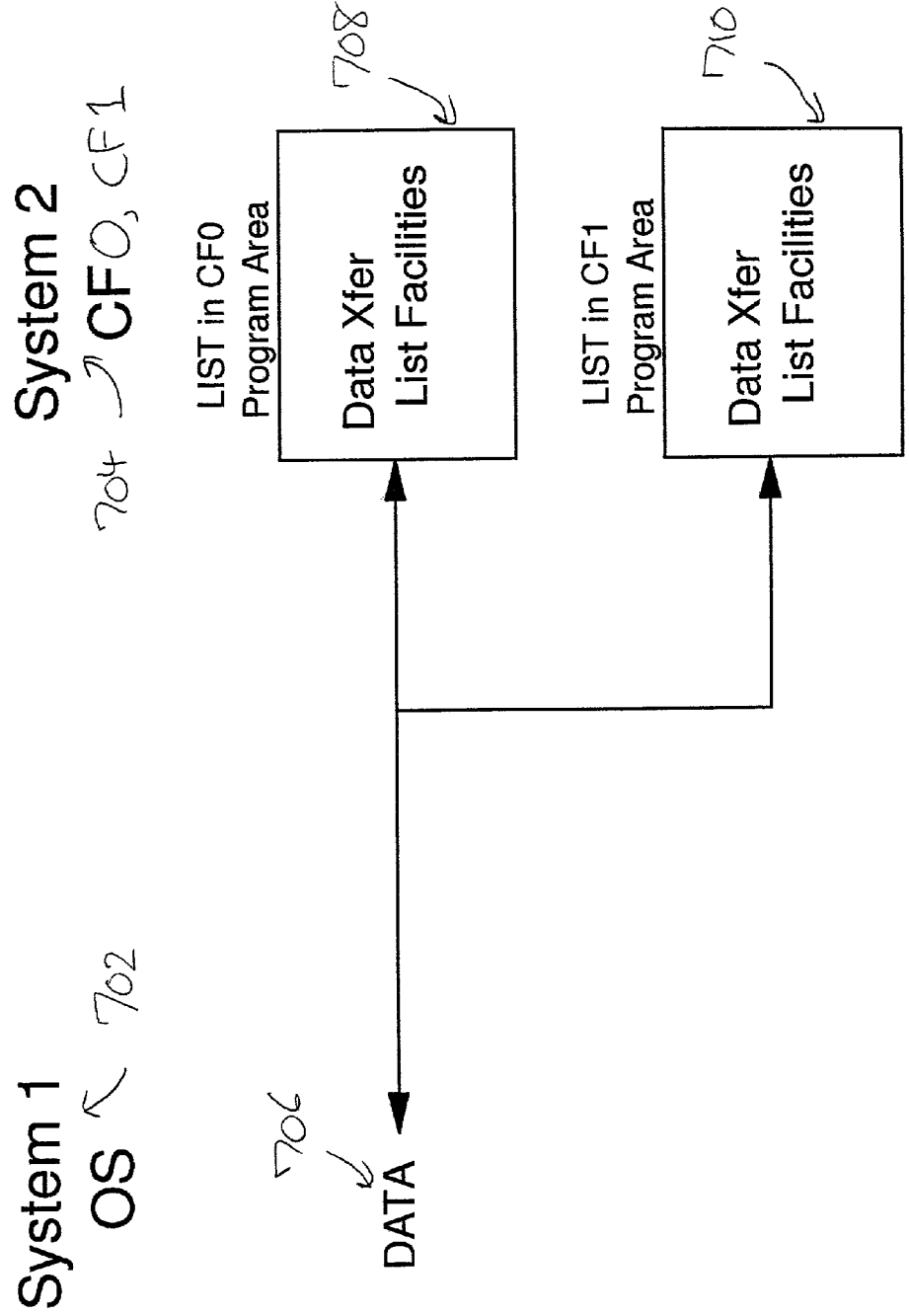
FIG. 7 depicts a diagram where a single I/O channel is shared by two CFs to send the data portion of the primary message directly to an from the CFs' memories in accordance with a preferred embodiment of the present invention.

FIG. 7 shows the details of data transfer for primary messages. As in the prior art shown in FIG. 4, the optional data is sent between an OS in System 1 702 and either CF0 or CF1 in System 2 704. The data is sent directly to and from the CFs main memory and comprises the following steps:

1) The CF0 or CF1 in System 2 704 decodes the MCB and determines that there is data to be transferred (as described in FIG. 6).

2) One of the CFs builds an address list of the data to be moved and loads its Data Transfer List Facilities 708, 710.

3) One of the CFs executes a special instruction to move the DATA 706.

4) The channel knows which Data Transfer List Facility 708, 710 to process since it knows which CF is executing the instruction. After the DATA 706 has been moved, System 2's 704 channel generates another hardware interrupt to its hypervisor. The hypervisor determines which CF finished sending data, and sets the Data Complete indicator 636, 646 in the CBOB 608, 610 (see FIG. 6) to alert either CF0 or CF1, respectively.

5) When the CF 404 detects the Data Complete indicator (by polling), it sends the MRB back to the OS as described in FIG. 6.

Figure 8:
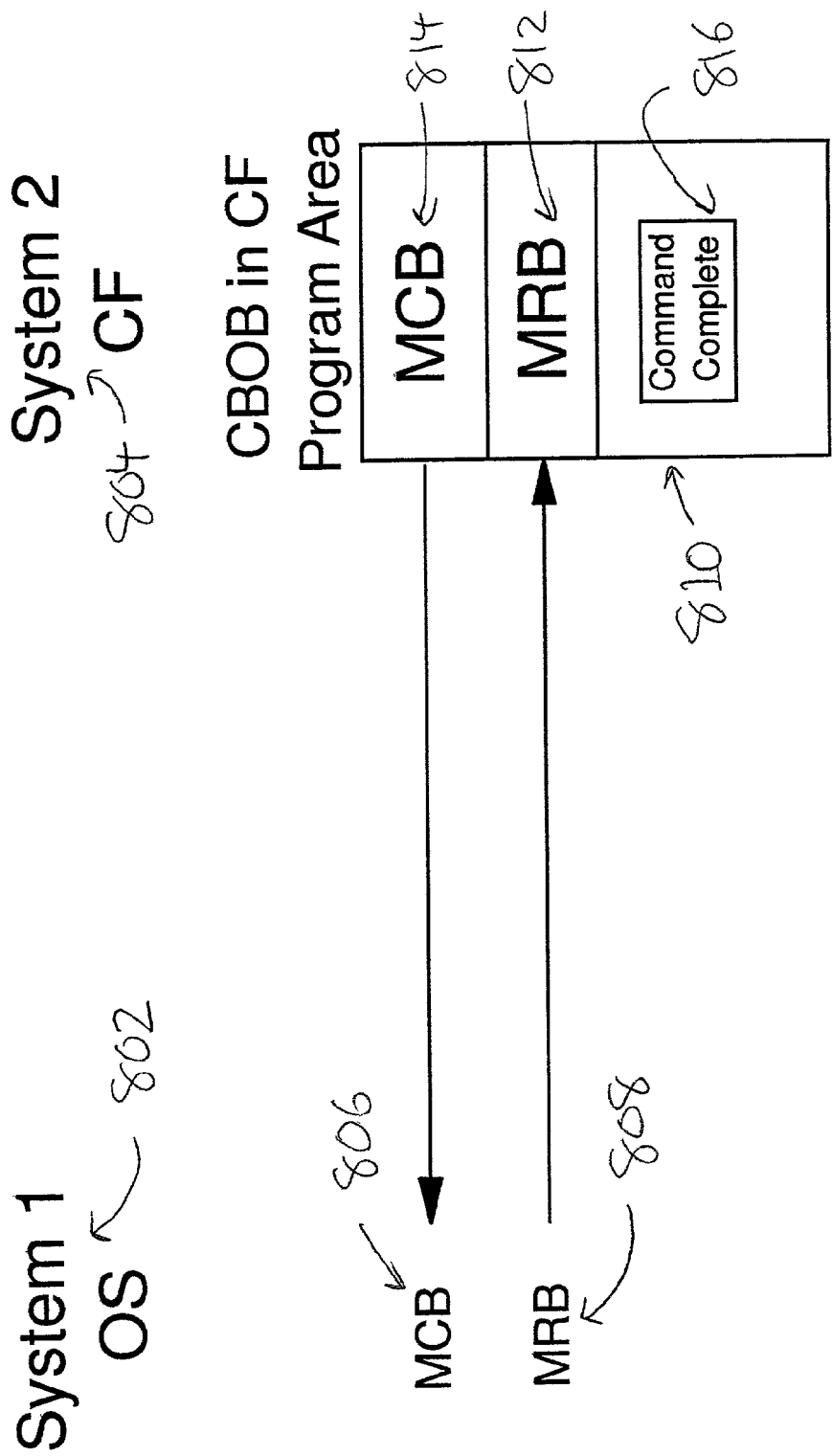
FIG. 8 depicts a diagram where the secondary message MCBs and MRBs are sent directly from and to a single CF partition's memory.

FIG. 8 shows how the prior art sends a secondary message from a CF in System 2 804 to an OS in System 1 802. The following steps are used.

1) The CF in System 2 804 generates an MCB 814 in its CBOB 810 located in the CF's main memory.

2) The CF executes an instruction to send the MCB.

3) The channel in System 2 804 sends the MCB 806 to System 1 802.

4) System 1 802 executes the MCB and sends the MRB 808 back to System 2 804.

5) System 2's 804 channel stores the MRB directly into the CF's CBOB 810 in area 812.

6) System 2's 804 channel sets the Command Complete indicator 816 in the CBOB 810 signaling the arrival of the MRB.

7) The CF detects the Arrival of the MRB by polling the Command Complete indicator in the CBOB and completes the message exchange.

Figure 9:
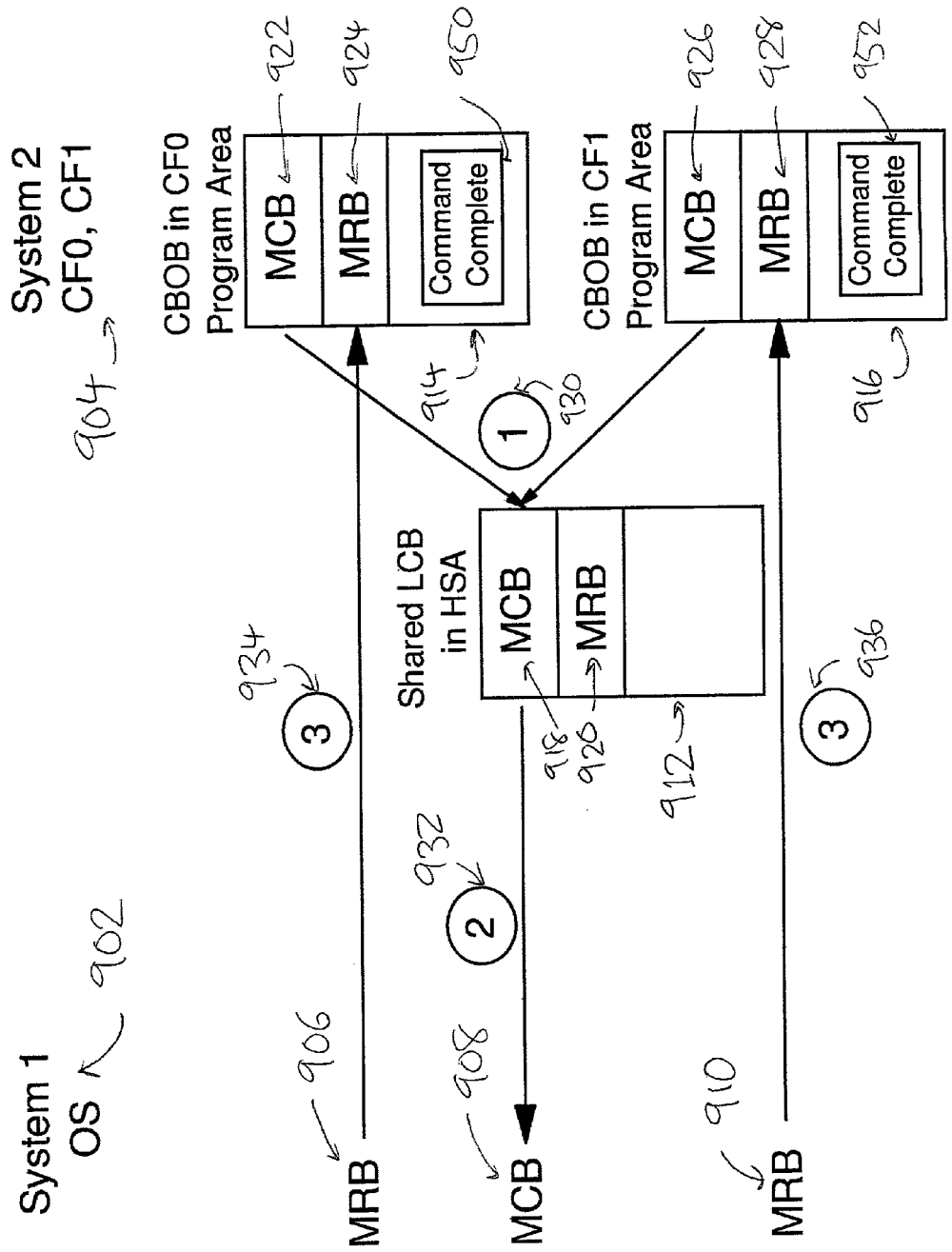
FIG. 9 depicts a diagram where the secondary message MCBs of the present invention are collected in a common area before they are sent to the OSs, and the secondary message MRBs are sent directly one of the two CFs' memories in accordance with a preferred embodiment of the present invention.

FIG. 9 shows the flow of secondary message frames within System 2 904 where two CFs share an originator secondary facility. Instead of sending the MCB 908 directly from either CF0's CBOB 914 in its main memory or CF1's CBOB 916 in its main memory to System 1 902, the instruction that the CFs use to send the MCB interrupts System 2's 904 hypervisor. The hypervisor then moves the MCB from either MCB area 922 or MCB area 926 to the hypervisor's CBOB 912 in Hardware System Area (HSA), shown in step 1 930. The hypervisor then instructs the channel to send the MCB 918 to System 1 902 in step 2 932. At the same time, the hypervisor prepares the channel in System 2 904 to steer the subsequent MRB 906, 910 to the correct CFs' CBOB 914, 916. When System 1 902 responds with the MRB, it is stored directly into the CFs' CBOB in area 924, 928. After System 2's 904 channel completes storing the MRB, shown in step 3 934, 936, it sets the Command Complete indicator 950, 952 in either CBOB 914, 916 signaling the arrival of the MRB. One of the CFs detects the arrival of the MRB by polling the Command Complete indicator in its CBOB 914, 916 and completes the message exchange.

The method and system of sharing recipient primary facilities is also used as a basis for replacing the CF's polling the Command Active indicators for active MCBs by an interrupt. In situations where the CF work load is low, polling consumes too many cycles. The CF would like to be blocked and then be restarted by an interrupt. In this case, the target system's hypervisor receives the MCB in its CBOB in its memory (HSA) and examines a field to determine to which CF or OS the message is to be routed. Once routed there, the hypervisor sets an interrupt to the CF or OS in addition to setting the Command Active indicator in the CBOB. This same interrupt can also be presented to the CF when data transfer completes and when a secondary command completes.

The method and system of sharing recipient primary and originator secondary facilities is also extended from CFs to OSs. OSs can send primary messages to not only multiple CFs within a target system, but they can also send primary messages to multiple OSs within the target system.

The OS sending the message creates an MCB targeted to either another OS or a CF. In the case of messages sent to another OS, the MCB describes the message buffer in the target to use. When the MCB is received at the other end of the link, the channel places it in a CBOB in HSA, and interrupts the hypervisor. If the hypervisor determines that the message is for a CF, it copies the MCB to the appropriate CBOB in the CF's memory, and sets the Command Active indicator. If the hypervisor determines that the command is for an OS, it has to move the data and creates an MRB since it cannot rely on the OS to be responsive in detecting and executing the MCB. A unresponsive OS will tie up the originator and recipient facilities. Assuming that the message is for an OS, the hypervisor examines the MCB to determine where to move the data, if any. The MCB itself can be moved into a pool of MCB buffers visible to the the OS, and the data can also be moved through a pool of buffers. Instead of a pool of buffers, the MCB may specify a particular buffer in the OS's memory. To move the data, the hypervisor instructs the channel in the same way that a CF does. After data movement is complete, a second hardware interrupt is generated, and the hypervisor generates an MRB depending on the outcome of the data transfer. The hypervisor instructs the channel to send the MRB. If the MRB can be generated before the data is moved to or from memory, the channel can be primed to automatically send the MRB from the CBOB pair after successful data transfer. When the originating OS receives the MRB, the message finishes as usual.

At this point, the originator and recipient facilities can be reused for the next message. It is up to a higher level protocol to establish and control the data buffers. The OS responses to the messages are accomplished through higher level protocols that cause a message to be sent in the opposite direction.

By having the hypervisor execute the messages (interpreting the commands (MCBs), transferring the optional data, and generating the responses (MRBs)), the originator and recipient facility utilization can be kept low and the link utilization can be kept high.

The Virtual Interface Architecture (VIA) can also be implemented with the OS to OS message passing described above. One of the most important characteristics of VIA is to be able to efficiently send messages from one system to another without calls to the operating system kernel. To do this, programs at each end of a link register portions of memory that can be accessed (read, write, or both) directly by the other end of the link. When data is received from the far end of the link, the address (or process ID) is used as an index into a translation table to determine the target of the data. Validation, or protection keys (32 bits) are provided to better isolate threads within the process owning the particular area of memory.

In VIA, the registration of the memory is performed by the kernel, and the hypervisor is informed of the mappings. Once the memory is registered, messages can be sent.

The message header is transmitted as an MCB, and if the message is short enough (less than about 1000 bytes) it could also be included in the MCB. After an MCB is received, the hypervisor examines the MCB to determine the address. It translates the address, and for short messages uses this address to move the message from the MCB buffer in HSA to the OS's memory. For longer messages, the hypervisor moves the optional data. After the message has been successfully transferred (with or without a large data area), the response is sent in the form of an MRB.

The VIA doorbell is implemented as an interrupt set by the hypervisor.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for use with one or more computer electronic complexes (CECs) having a hypervisor and hypervisor memory for coupling Input/Output channels for sharing among images of multiple Coupling Facilities for primary messages sent from an external Operating System, comprising the steps of:

receiving from an external Operating System a message request in the hypervisor's memory and interrupting said hypervisor;

having the hypervisor examine fields within the message request to identify a target Coupling Facility among said multiple Coupling Facilities;

moving said message request to memory of the targeted Coupling Facility; and setting an indicator in the targeted Coupling Facility to alert it to the arrival of the message request and to share an Input/Output channel for primary messages sent from an external Operating System among images of said multiple Coupling Facilities or for enabling a machine having multiple coupling facilities to pass messages directly between instances of an operating system without any Coupling Facility involvement, including the steps of:

interrupting a hypervisor when a secondary message request is ready to be sent;

moving a message request to the hypervisor's memory;

having the hypervisor send said secondary message request over a link; and preparing the Coupling Facility channel for the receipt of said secondary message and whereinafter upon receipt of said secondary message a secondary message completion indicator is set in the Coupling Facility's memory.

2. The method as recited in claim 1, wherein upon receipt of the secondary message, said secondary message is placed by the Coupling Facility's channel directly into the memory of the Coupling Facility; and thereafter said secondary message completion indicator is set in the Coupling Facility's memory.

* * * * *